US005799202A

United States Patent [19]

Rongione

[11] Patent Number: 5,799,202

[45] Date of Patent: Aug. 25, 1998

[54] VIDEO TERMINAL ARCHITECTURE WITHOUT DEDICATED MEMORY

[76] Inventor: Eric Rongione, 121 Avenue de Malakoff, 75764 Paris, France

[21] Appl. No.: 839,102

[22] Filed: Apr. 16, 1997

Related U.S. Application Data

[63] Continuation of Ser. No. 322,399, Oct. 12, 1994, abandoned, which is a continuation of Ser. No. 792,875, Nov. 19, 1991, abandoned.

[30] Foreign Application Priority Data

Nov. 19, 1990 [FR] France .................................. 90 14366

[51] Int. Cl.$^6$ ........................................................ G06F 3/00

[52] U.S. Cl. ....................................... 395/800.01; 345/516

[58] Field of Search ......................... 395/800.01, 800.32, 395/825, 828, 882, 788, 100, 115; 364/400, 424.033; 382/162, 232, 254, 276; 345/113, 150, 340, 516

[56] References Cited

U.S. PATENT DOCUMENTS

| | | | |
|---|---|---|---|
| 4,342,095 | 7/1982 | Goodman | 364/900 |
| 4,363,108 | 12/1982 | Lange et al. | 364/900 |
| 4,404,554 | 9/1983 | Tweedy, Jr. et al. | 345/25 |
| 4,549,172 | 10/1985 | Welk | 345/22 |
| 4,604,743 | 8/1986 | Alexandrv | 370/85.11 |
| 4,631,699 | 12/1986 | Siwiket et al. | 395/575 |
| 4,642,794 | 2/1987 | Lavelle et al. | 364/900 |
| 4,646,077 | 2/1987 | Culley | 345/192 |
| 4,646,261 | 2/1987 | Ng | 364/900 |
| 4,858,107 | 8/1989 | Fedele | 395/425 |
| 4,862,156 | 8/1989 | Westberg et al. | 345/133 |
| 4,866,600 | 9/1989 | Ballard et al. | 364/200 |
| 4,965,670 | 10/1990 | Klinefelter | 348/586 |
| 5,001,652 | 3/1991 | Thompson | 395/164 |
| 5,151,997 | 9/1992 | Bailey et al. | 395/800 |
| 5,227,863 | 7/1993 | Bilbrey et al. | 358/22 |
| 5,319,786 | 6/1994 | Yamamura | 395/800 |
| 5,341,470 | 8/1994 | Simpson et al. | 395/164 |
| 5,502,808 | 3/1996 | Goddard et al. | 395/161 |

FOREIGN PATENT DOCUMENTS

| | | |
|---|---|---|
| 080043 | 6/1983 | European Pat. Off. . |
| 259827 | 3/1988 | European Pat. Off. . |
| 283579 | 9/1988 | European Pat. Off. . |
| 64-001033 | 1/1989 | Japan . |

OTHER PUBLICATIONS

IBM Technical Disclosure Bulletin, vol. 26, No. 4, Sep. 1983, Direct Extraction Of Data From The Refresh Buffer Of A Display G. J. Barnett, et al.; pp. 2156–2158; p. 2157, line 10–line 29; Fig. 1.

*Primary Examiner*—Alpesh M. Shah

*Attorney, Agent, or Firm*—Kerkam, Stowell, Kondracki & Clarke P.C.; Edward J. Kondracki

[57] ABSTRACT

A video terminal architecture and an associated management circuit for managing the display of the video terminal are dislcosed. The terminal architecture includes a microprocessor (81) connected to the management circuit (85) via a first data bus (8549) and a first address bus (8558). The management circuit (85) manages the video display and accesses to a video memory VRAM (83). The VRAM includes the system memory and the display memory. The management circuit (85) is memory and the display memory. The management circuit (85) is also connected to a read-write character generator memory (82) via a second address data bus (8529), a second data bus (8529), and by five output lines to the video monitor.

36 Claims, 10 Drawing Sheets

VIDEO TERMINAL ARCHITECTURE WITHOUT DEDICATED MEMORY

This application is a continuation of application Ser. No. 08/322,399, filed Oct. 12, 1994, now abandoned which is a continuation of application Ser. No. 07/792,875 filed Nov. 19, 1991, now abandoned.

FIELD OF THE INVENTION

The present invention relates to a terminal architecture and o the associated management circuit.

BACKGROUND OF THE INVENTION

The background of the invention will be described with reference to FIGS. 8–14.

Most mainframe information processing systems have two types of alphanumeric terminals at their disposal. One type is illustrated as G terminals 5 (FIG. 8), clustered in a local area network connected via a server 3 to a front-end processor 2, which most often is of a proprietary type and the product of experience acquired for development of the majority of local area standards and managed by a data concentrator. The other type is illustrated as monoconsole (M) terminals 4, connected to systems 1 either directly at the same site or via modems 24. The essential differences in terms of electronics are thus the communication modules and the size of the RAM and ROM memories on the microprocessor-managed logic board. For terminals produced in larger quantities, the various architectures have a significant impact on the overall cost of the terminal, and the choice of standard memories sold by many vendors all over the world is one of the main factors guiding architecture.

The video module that controls terminal display generally has random access memory (RAM), having a capacity which increases as a function of the memory sizes necessary for the multiple protocols for the presentation of the various terminal emulations available from the vendor's catalog. Moreover, the display quality demanded by users requires the construction of terminals with a line scanning frequency on the order of 32 kHz, a screen refreshment frequency well within 70 Hz. As a consequence, the character frequency is increased and the access time to display memories is reduced. Thus to display 80 columns or 132 columns, the character frequencies needed are as high as 3.5 and 6 MHz, respectively.

In the terminals, a standard image of 25 rows and 80 columns is described in video memory by 25 times 80 words of 16 bits each. These 16 bits are generally made of of the ASCII code on 7 or 8 bits, and attributes for each character on 8 bits, making it possible to obtain the visual outcomes associated with character attributes, such as under-lining, blinking inverse, inverse video, and so forth. The association of the code and the attribute accounts for 15 to 16 bits and will hereinafter be called the CODATT of the given character. One such image requires 25×80×2 8-bit bytes, or 4 kilobytes of RAM for the video memory; similarly, for 132 columns, 25×132×2=6.6 kilobytes is needed, and for an image of 43 rows of 132 columns, 11.4 kilobytes or 5.7 kilowords of 16 bits each. This image represents all the characters that can be displayed simultaneously on a screen and thus represents all or part of the buffer image stored in the central memory (or system memory of the microprocessor) and is constituted by the characters transmitted by the central processing unit and received by the terminal. These characters accumulate in buffer line 87 (FIG. 9), before being processed by the microprocessor and transmitted to the system memory RAM comprising the buffer image or video buffer 41. The display process then transfers these characters from the buffer image RAM 41 to the screen memory RAM 44. Thus the successive images, which are displayed either in block mode, must be received either with 25 rows updated at once, or in the continuous scrolling mode, where the first row is erased, the next 24 rows rise by one position, and only the last row is replaced by the new row. Consequently, when successive images are scrolled on the screen, each image originating in the video buffer 41 must be reloaded into the screen memory 44 (FIG. 9). A good screen updating speed brings about good ergonomics in terms of display for the user. This level of quality is reached when there is an output higher than 50,000 new characters per second, for applications involving the types of terminals discussed above. Because of the display ergonomics associated with the various presentations, functions such as smooth scrolling in strips (horizontal "screen slices") must be taken into account. In all the cases discussed below, reference will be made to the 132-column mode, which is the most demanding in terms of speed; it therefore has more impact on architecture and means that most often, the trend is to faster and hence more expensive memories.

The various means of data transfer between the system memory 41 and the screen memory 44 are achieved either by updating by the microprocessor 81 (FIG. 9), or by direct memory access (FIG. 14). Two techniques are typically for updating by the microprocessor, by which the microprocessor more or less has at its disposal the band-width for performing updating of the screen memory 44. The screen memory is a dual-ported memory dedicated to the screen and shared between the microprocessor and the video controller. The fact that two separate types of memory are used, the system memory 41 and the screen memory 442, 441 (FIG. 10), increases the production cost. In a first case, the microprocessor may have half the band-width of the video. This is what is obtained when, as represented by the window line in FIG. 11, the character clock is shared in two time intervals, one assigned to the microprocessor, for example for writing a word to be updated, and the other to the video controller for permanent and successive reading of the word constituting the screen memory. In another solution, shown in FIGS. 13 and 14, the microprocessor has a very reduced portion of the video band-width, allowing it to write the new word in a buffer if the buffer is "empty", the effective updating being performed by a sequencer during the horizontal line returns.

FIG. 10 shows an implementation based on the principle of band-width sharing, associated with FIG. 14 for the timing diagrams. This type of implementation requires static RAMs having access times clearly shorter than the clock period divided by two; for 132 columns with a 170 ns character clock, for example, the access time is 35 ns, for the two memories 441, 442 including the CODATTs. Thus, in order to meet the requirements dictated lay various emulations, one must use the memory size that covers the emulation consuming the most memory, or in the case of our application, static RAMs yielding eight 16-bit kilowords (for the 5.7 kilowords required). This solution necessitates the choice of two fast 8K×8 static memories with access times of. This is an expensive solution because it is outside the static RAM standards that instead are centered around 100 ns. The microprocessor prepares for the updating by buffer storage of the addresses of the CODATTs only. Thus, this solution leaves less than 50% of the potential video band-width for the microprocessor. This approaches the maximum fourteen updatings ("CODATTs") per 32-kHz-frequency video line, providing a potential maximum output of 450,000 new characters per image, which is amply sufficient, despite the increased slowing down of the microprocessor for its video accesses. In fact, upon each video access, the microprocessor is slowed down by the asynchronism between its cycle and the window assigned to it, thus shifting the writing cycle to the following microprocessor window, which requires a wait state of the microprocessor and the presence of two buffers 470, 471 (FIGS. 10 and 11). A certain band-width loss on the part of the microprocessor therefore ensues. This may also depend on the display process program being used.

FIG. 12 shows a configuration based on the principle of the reduced band-width portion, also corresponding to European Patent Application 87 400711.5, filed Apr. 1, 1987. In the active portion of the display, as shown in the timing diagram of FIG. 13, the controller 33 permanently reads the various positions of the video memory 442, 441 so as to gather the "CODATT(i)s" (i is from 1 to 132, associated with 132 characters on each row of the screen) at the character clock rate, which means that a reading cycle of one 16-bit word takes 170 ns for the 132-column mode.

The microprocessor prepares for updating by latching the addresses this time and, in the registers 470, 471, latching the data of the "CODATT" word, and an automatic machine executes the command during the next horizontal return of the spot. During this horizontal return the spot that excites the phosphorus on the cathode ray tube is extinguished, and consequently the video controller has no need to read the video memory. This avoids the need to manage the interleaving of the accesses of the microprocessor and video processor as in the previous case. Here, one can use the slower static memory: Two 8K×8 RAMs, with an access time of 100 ns, suffice and make this solution less expensive than the one before. However, the updating output remains more modest, i.e., on the order of 30,000 new characters per second, which is still highly inadequate for the performance demanded. Moreover, a phenomenon of "stairstep" display performance is observed, due to the emptying of the line buffer and the refilling of the screen buffer, which are linked to the limitation to one updating per video line.

Another technique for updating by direct memory access or DMA is illustrated in FIG. 14. There are two memories 420, 421 of the FIFO type that are 132 columns deep and 16 bits wide, making it possible to store two consecutive rows on the screen (FIG. 14). While one FIFO (420) representing the 80 or 132 CODATT words of row n (which in the two previous examples is associated with permanent reading of the screen memory by the video controller) is emptied, the other FIFO (421) is filled with the 80 or 132 CODATT words of the row n+1, if possible with the greatest band-width. A high-performance DMA controller is then used, which employs system-memory data reading 41 at the same time as the data are written into the FIFO 421, which entails recopying the CODATT data of row n+1, originating in the system memory 41, into this FIFO 421. Here, the dedicated video memory is reduced to two FIFOs. This solution is complex to achieve and is an excessive consumer of the band-width (for example, on the order of 35%, despite a high-performance DMA, for 12 video lines per row), but it makes display performance of 530,000 new characters per second feasible. Nevertheless, it requires three FIFO memories in the case of smooth strip scrolling of the screen, which further degrades the band-width of the microprocessor. In fact, it is necessary to be capable of reloading two FIFOs within the time of 12+1 video lines, which changes the 35% to 64%. In that case, the remaining band-width of the microprocessor is limited to only approximately 36%, which can prove insufficient when some of this band-width is assigned to the local area network DMA. Moreover, this last provision is poorly suited to integration in ASICs of the gate array type. If there is even the slightest desire to include the FIFOs in them, the chip becomes large and is poorly suited to the low price that had been intended. Although integrated circuit vendors have already made such "custom" chips, they have done so without integrating the attribute controller feature (FIG. 14) into them. The attribute controlled receives the CODATTs and motifs (or character slices) originating in the character generator before converting them into red, green, and blue signals that are "intelligible" to the monitor. One of the essential purposes in constructing low-cost terminals, on the electronic logic plane, is to integrate as many as possible at an optimal price. This is done by integrating the attribute controller, which is generally vendor-specific, because of the various emulations of terminals supported in the past. In the versions discussed above, either the cost is excessive because of the addition of a dedicated memory, or there is some degraded display performance.

OBJECTS AND SUMMARY OF THE INVENTION

Thus, in view of the foregoing, it is an object of the present invention to provide a terminal architecture using a video RAM or VRAM memory package, to obtain good display performance while avoiding the use of, and need for, a dedicated memory.

This object is attained in an architecture that includes a microprocessor connected via a data bus to a circuit for managing the video display and accesses to a video memory VRAM constituting the system memory and the display memory; the management circuit is also connected, via an address bus and a data bus, to a read-write character generator memory, and bar five output lines (R, G, B, HRTZ, VRT) to the video monitor.

Another object of the invention is to optimize the cost. This object is achieved by the management circuit which is embodied as an integrated monolithic circuit and includes, in addition to the management circuits for the reading and writing accesses to the video memory and the circuits commanding the serial shift of the video memory, a circuit making it possible to store the code and the attribute to the current character in order to transmit the attributes to the attribute controller circuit; a circuit is provided that makes it possible to store the data constituting the motif of a character originating in the read-write character generator memory.

Another object is to provide an architecture that is adaptable to different character sizes. This object is achieved in that the circuit that enabling storage of the current motif is a pipeline constituted by four series-connected buffer registers, the outputs of which are sent to the inputs of the attribute controller circuit as a function of the signal furnished by a motif counter and parametrized as a function of the width of the motifs of between 9 and 15 pixels per character slice.

Another feature of the invention is a slice. counter that is parametrizable from 1 to 16 is used in combination with the code and with a 4-bit counter, or nibble counter, that is parametrizable between 0 and 3 to furnish the address of the motif in the character generator. A command circuit furnishes the signals CS, WE, OE necessary for the functioning of the read-write character storage memory.

In another object is to furnish an architecture that is adaptable to different screen sizes. This object is attained in that the circuit includes an automatic machine which makes it possible to manage from 1 to 132 columns and from 1 to 512 lines per screen.

In another particular feature of the invention, the automatic machine manages the signals for interfacing with :he read-write video memories by delivering the signals RAS, CA; DT, OE necessary for the function of this memory, in particular refreshment and data transfer, and serialization of the static RAM portion.

In another particular feature of the invention, the display management circuit includes means HOLD, HOLDA for managing the exchanges with the microprocessor during the critical instant of loading of the VRAM serializer, in order to prevent access by the microprocessor to the VRAM. The access contention to this VRAM by the microprocessor and the video is thus resolved during the transfer of one row in the serializer.

In another particular feature of the invention, the circuit enabling storage of the code and the attribute of a character is a pipeline, constituted by a first set of series-connected buffer registers and a second set of buffer registers each connected respectively at the output to a register of the first set and loaded at the rate of the signal of a modulo-n counter, wherein is the number of registers in the first set.

In another particular feature of the invention, the management circuit includes a pointer counter, the triggering of which is done in anticipated fashion relative to the loading of the address of the row being processed.

Further characteristics and advantages of the invention will become more apparent from reading the ensuing description, taken in conjunction with the accompanying drawings.

BRIEF DESCRIPTION OF THE DRAWINGS

The invention will be described herein with reference to the following figures, wherein.

DESCRIPTION OF THE PREFERRED EMBODIMENTS

Figure 1:
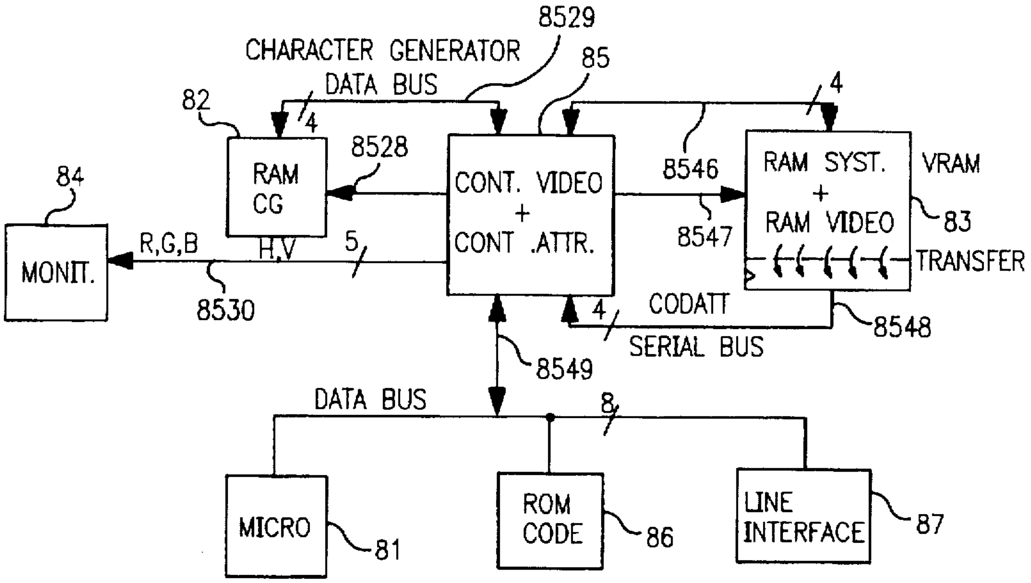
FIG. 1 is a diagram showing the terminal architecture principle according to the invention.
Figure 14:
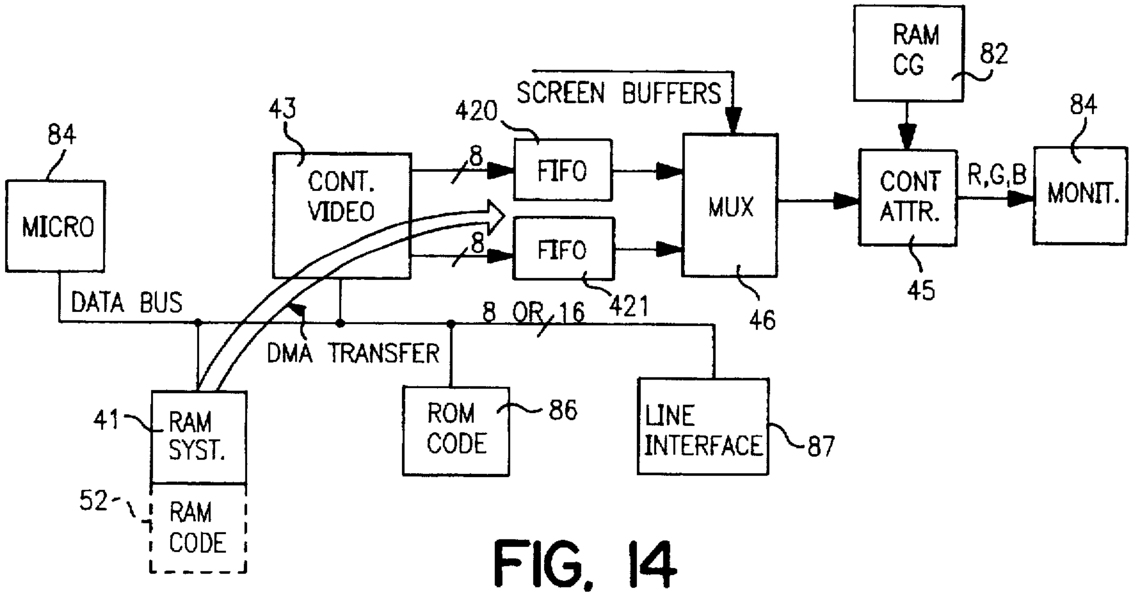
FIG. 14 PRIOR ART
FIG. 14 is a diagram showing the principle of another terminal architecture according to the prior art.

The terminal architecture according to the invention shown in FIG. 1 includes a microprocessor 81 connected via an 8-bit data bus to a video circuit 85 for managing the display on a monitor 84 and for managing the exchanges with a random access character generator memory 82, a read-write video RAM memory, or VRAM, 83. The linkage between the microprocessor 81 and the management circuit 85 is done through an 8-bit data bus 8549. The linkage between the management circuit 85 and the monitor 84 is done via a five-line bus 8530 that furnishes red (R), green (G), blue (B), horizontal retrace (HRTC) and vertical retrace (VRT) signals. The linkage between the management circuit 85 and the read-write static character generator memory (SRAM) 82 is realized via an address bus 8528 with fourteen address lines and a data bus 8529 with four data lines. The linkage between the management circuit 85 and the video memory VRAM 83 is done on the one hand for the parallel portion via an address bus 8547 with nine address lines and via a local data bus 8546 with four data lines, and on the other for the serial portion via a 4-line bus 8548. It will be recalled that a VRAM is composed of a standard dynamic RAM, to which access is gained by a conventional "parallel" bus, and a fast static RAM known as a serializer, configured as a shift register which is read via a "serial bus", all of them in the same package (FIG. 3); the coupling between the two memories is realized by putting one row of words, read in the VRAM, into contact with the inputs of the shift register; the command for "parallel" loading of the shifter is done at a very precise instant, specified by the VRAM in synchronization with the shift clock. It is this simultaneous transfer of all the words of one row over a very "wide bus" internal to the VRAM that lends it a wide band-width. Since the VRAM is essentially a dynamic RAM, the price per bit is accordingly minimized, although its control logic is more complex because it requires both a cell refreshment logic and a transfer logic for transfer from the VRAM to the static RAM, sometimes called a "shifter".

Figure 3:
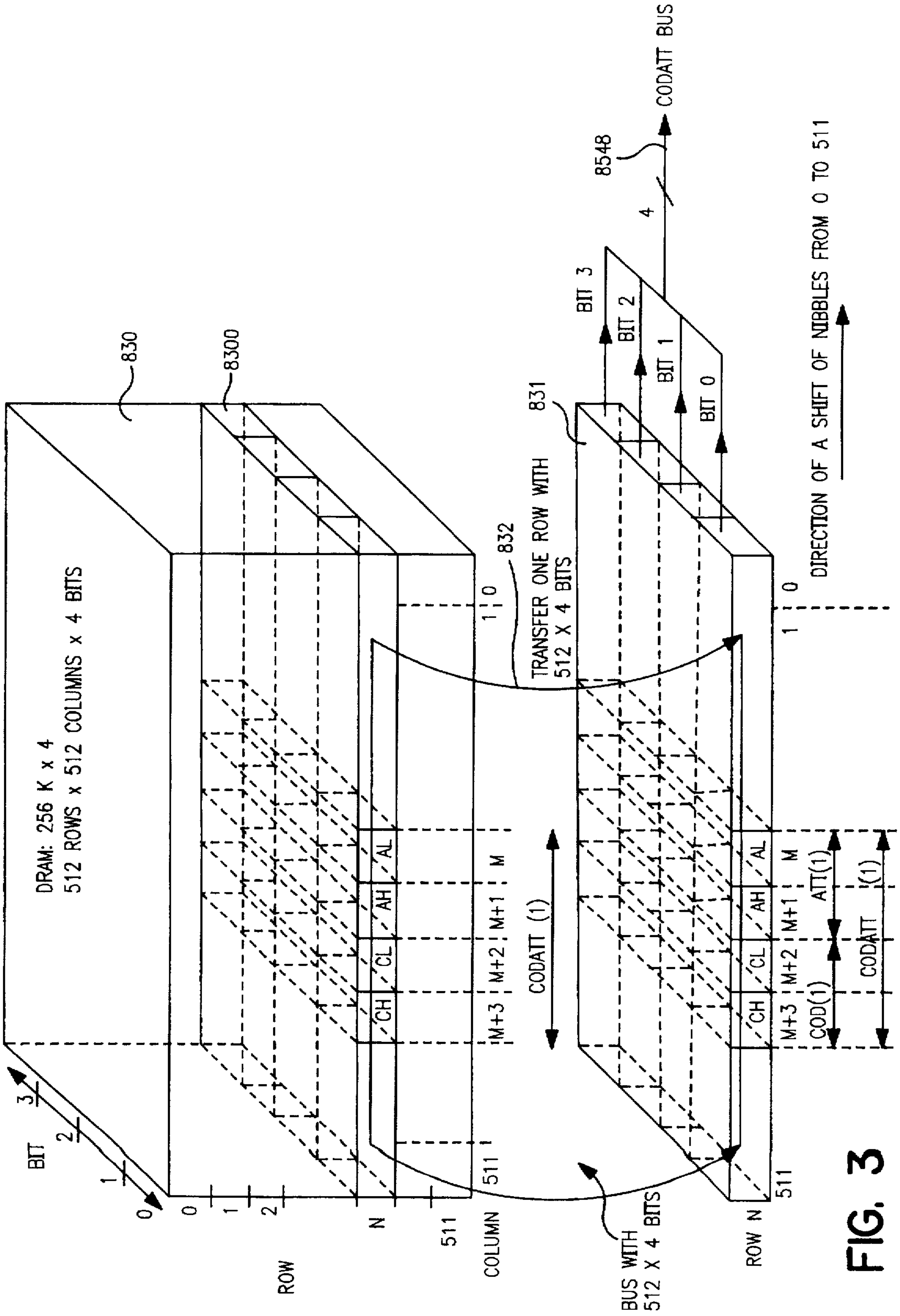
FIG. 3 is a diagram showing the principle of storing and transferring data in a video memory.

FIG. 3 shows the organization of a video memory VRAM i:n which one part (830) is constituted by a dynamic read-write memory, with a capacity for example of 256 kilowords, each word having four bits, these 256 kilowords being organized in 512 rows of 512 columns. In a row n (8300), four nibbles constitute the 16 information bits, corresponding to the eight code bits and the eight attribute bits defining the code and the attribute (CODATT) of the character to be displayed in a screen row. These four nibbles are called CH for the high code and CL for the low :ode of the character, and AH for the high attribute and AL for the low attribute, respectively. A memory matrix slice 8300 is transferred over the bus 832, having 512×4 bits, to the static read-write memory 831 formed of 512×4 bits. This memory in fact comprises four 512-bit registers, and its serial outputs constitute the four lines of the serial bus 8548. A memory slice 8300 makes it possible to memorize the 128 CODATT information elements corresponding to each character on a screen, which in this way can at most contain 128 columns of characters.

Figure 4:
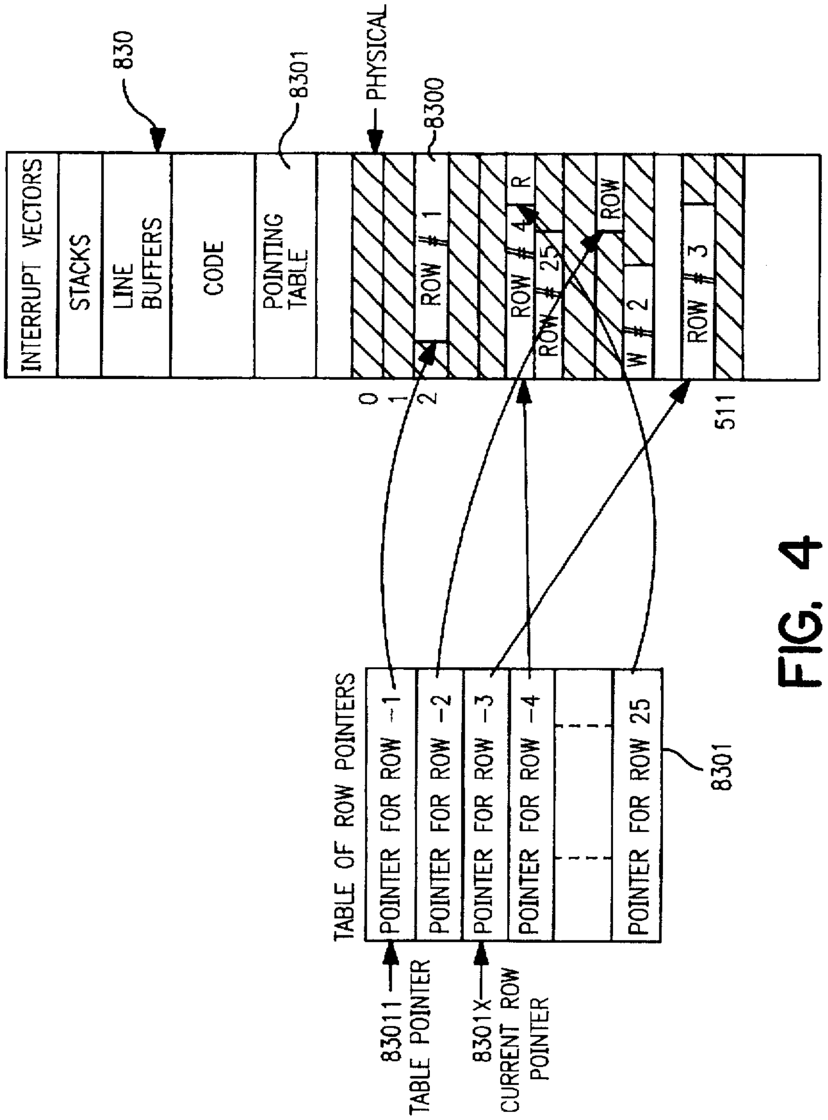
FIG. 4 shows the principle of storing code and attribute data as well as other elements in the video memory.
Figure 5:
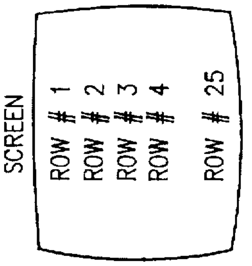
FIG. 5 shows a display including 25 rows of 80 or 132 columns of characters.

FIG. 4 shows the logical organization of the dynamic readwrite memory 830, and FIG. 5 shows a screen formed of 25 rows of x columns of characters, the number of columns being variable between 80 and 132. The characters may have a size of between 1 and 15 points per slice, each character including from 1 to 16 slices as motifs. The dynamic memory 830 may be organized in such a way as to contain the interruption vectors, the registers necessary for managing piles, line buffers, the code necessary for terminal function, and in particular for management of the display and communications via a line interface 87 connected via the bus 8549 to the microprocessor 81 and to the management circuit 85, as shown in FIG. 1. In terminals connected in at local area network, a "boot" in ROM makes remote-booting of the terminal, by way of the local area network, possible, with its presentation program originating in the data concentrator; in the terminal, this code to be executed by the microprocessor is accommodated in the DRAM portion of the VRAM along with the image buffers, which requires a memory of larger capacity: A VRAM with a capacity of 256K×4 will be preferred. For console-type terminals, a 64K×4 VRAM memory may be sufficient, since the microprocessor executes the code only in ROM.

This memory 830 also contains a pointing table 8301, which as shown on the left in FIG. 4 contains the table pointer 8:3011 and the various row pointers, including the current row pointer 8301, these pointers defining the addresses of rows corresponding to the memory portions, such as 8300, for row #1, for example, in which all the CODATT information elements corresponding to each of the characters constituting one screen display row are contained in the memory.

Figure 6:
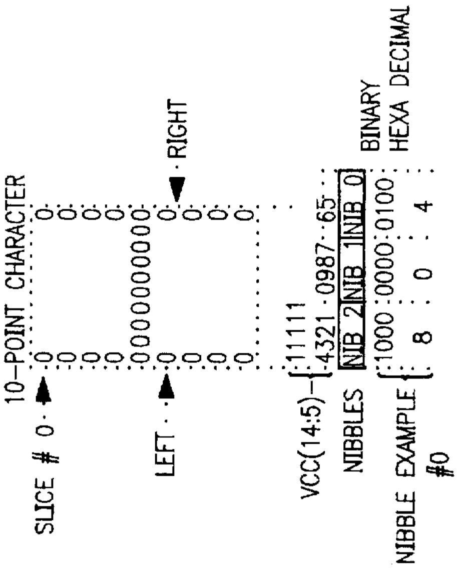
FIG. 6 represents a 10-point character and shows the correspondence between the character slices and the nibbles that define a slice.

The representation of one character is achieved by 16 slices of 9, 10 or 15 points, depending on the size of the character, and these representations are stored in the static memory 32 constituting the character generator. This information is memorized in the form of nibbles, identified by reference numeral (nib 0 through nib 3), which depend in number on the number of points of each character. These nibbles are arrayed at defined addresses in the memory. Thus as can be seen in FIG. 6, the character H is represented by a matrix of 10 points×9 lines; the nibble nib 2 of slice 0 will have the hexadecimal value 8, the nibble nib 1 the hexadecimal value 0 and the nibble nib 0 the hexadecimal value 4. Each of these nibbles will constitute the four elements of information sent serially over the four lines of the bus 8529, these information elements making it possible to reconstitute the slice 0 of the letter H for a 10-point character. Two, three or four nibbles are memorized in the memory 82 in the same way for each slice of each character, depending on the slice of the character, whether it is an 8-, 9-, 10- or 15-point character.

Figure 2A:
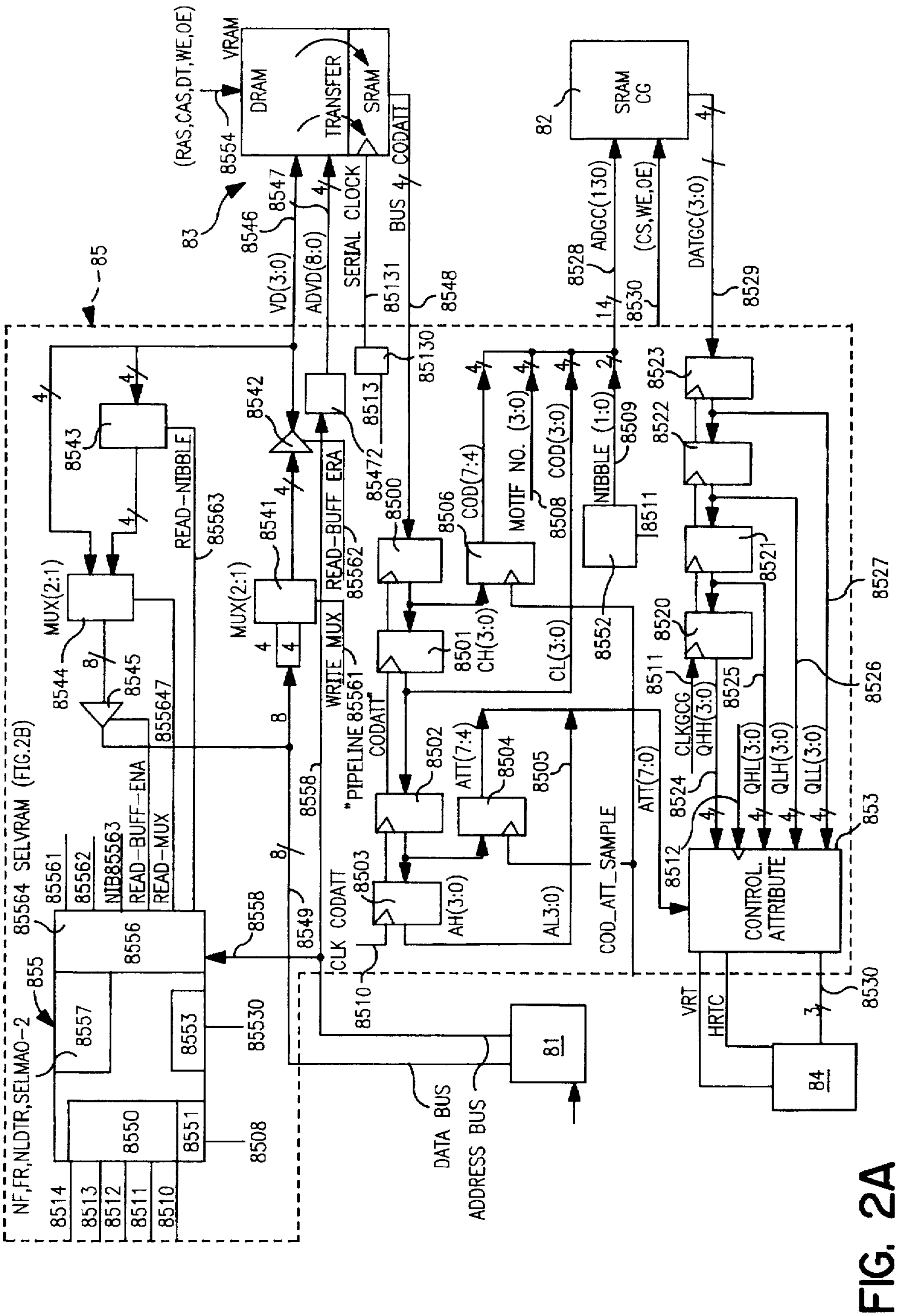
FIG. 2A is a diagram showing the principle of the video, memory management circuit making it possible to employ the architecture of the invention.

The circuit 85 makes it possible to manage the exchanges among the various constituent elements of the terminal. A first substituent subset of management of the transfers between the microprocessor 81 and the dynamic memory portion of the memory VRAM is embodied by a logic for managing writing and reading transfers 8556 (FIG. 2*a*) between these elements and the physical circuits that enable this linkage. This management logic 8556 generates, among others, the signal (SELVRAM) 85564 to the sequencer 85477, which furnishes the rate of the control signals to the VRAM. The signal SELVRAM is a simple decoding of the address of the bus 8558.

Figure 2B:
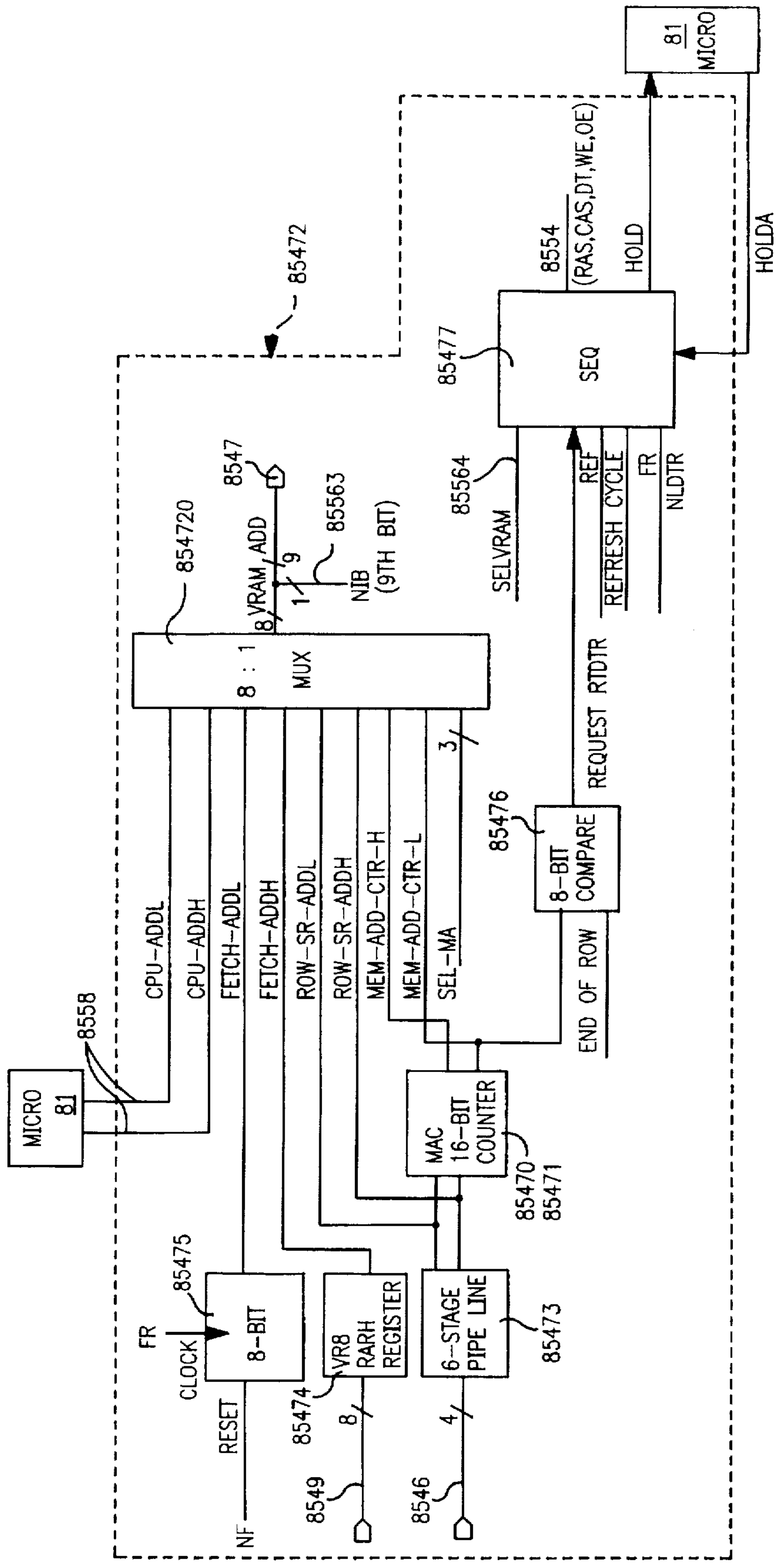
FIG. 2B is a diagram of the addressing circuit of the video memory management circuit of the invention.

The physical circuits are constituted by a muliplexer 8541 connected to eight lines of the data bus 8549 of the microprocessor 81 and at a writing multiplexing command signal receiving the signal 85561 originating in the management logic 8556. This writing multiplexing signal makes it possible to convert the signals arriving over eight bits via the bus 8549 into two 4-bit signals, which are transmitted from the multiplexer 8541 to a buffer circuit 8542, the output of which is connected via a 4-line bus 8546 to the four data input lines in the dynamic read-write memory of the VRAM. The buffer circuit 8542 is commanded by a signal ENBUFECR for validation of the writing buffer 85562, furnished by a second output of the control logic 8556. The memory (FIGS. 2A and 2B) is addressed by an addressing circuit 85472 connected at the output to the VRM address bus 8547 and at the input to the microprocessor address bus 8558. This addressing circuit 85472, shown in FIG. 2B, includes a register 85474 connected at the input to the data bus 8549 of the microprocessor 81 and at the output to a multiplexer 854720 for furnishing the eight bits of the high part (FETCH-ADDH) of the current row pointer address (8301X). These eight bits of the high portion are in fact the address of the beginning of the pointing table. The low portion (FETCH-ADDL) of the current row pointer address is furnished by an 8-bit counter 85475 that is reset to zero by the signal NF indicating a new frame and incremented upon each new character row by the fetch-request signal FR. A logic NIB 85563 originating in the circuit 8556 makes it possible to address the nibble of the VRAM for- the eight multiplexed buses.

A 6-stage pipeline 85473, at its input, receives the four lines of the parallel data bus 8546 of the VRAM. This pipeline 85473 makes it possible to store the six nibbles (24 bits) defining the address of the next row defined by 16 bits, as well as its row attribute that with eight bits defines whether the row is of double height, double width, or at the beginning or end of smooth scrolling or normal scrolling. At the input of the multiplexer 854720, the sixteen address bits of the next row, which are furnished at the output of four of the buffers of the pipeline 85473, define the signals ROW-SR-ADDL for the low address of the row register and ROW-SR-ADDH for the high address of the row register.

Figure 7A:
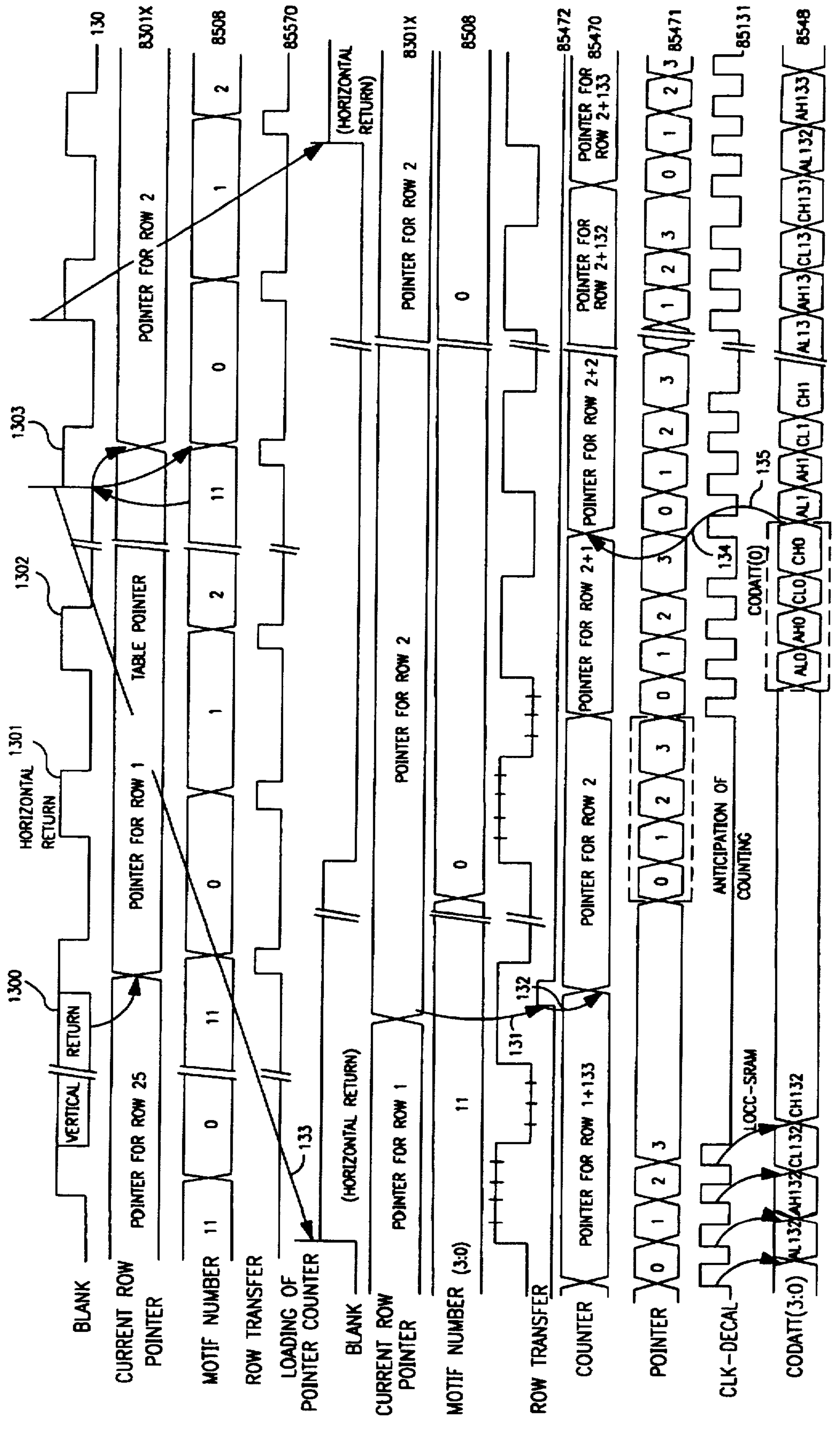
FIG. 7 is a timing diagram of various signals, showing the function of the exchanges between the video memory, the character generator memory and the display management circuit.
Figure 7B:
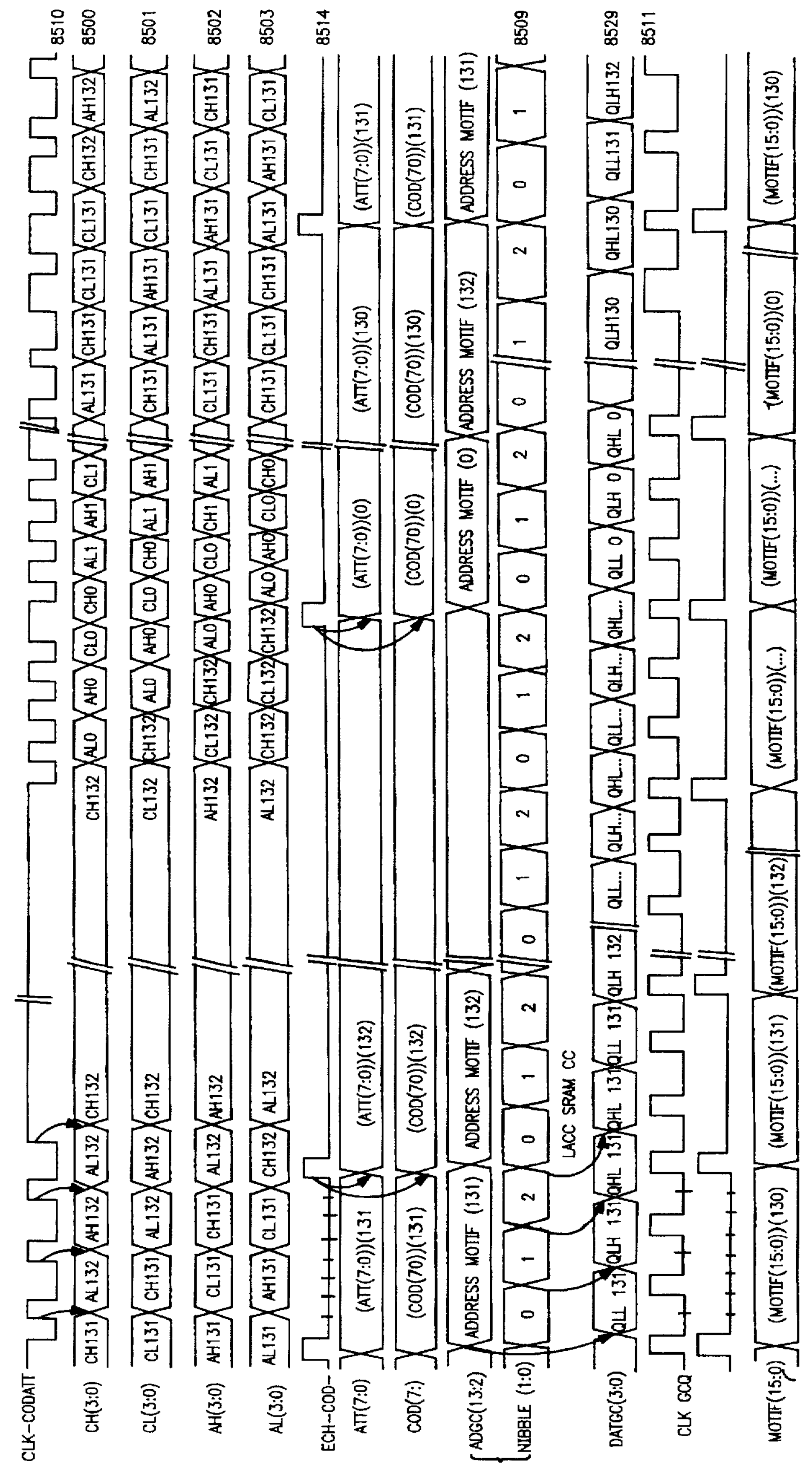
Figure 8:
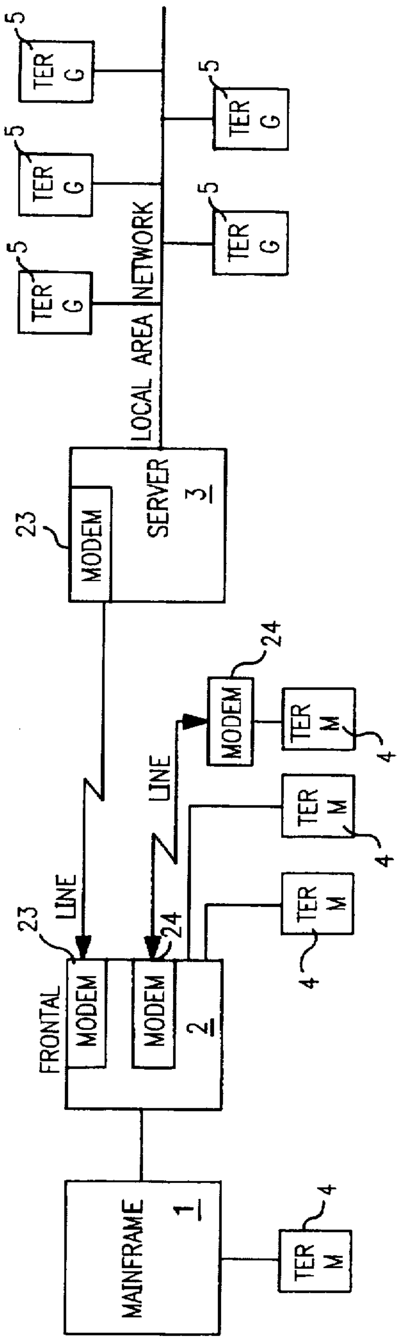
FIG. 8 PRIOR ART
FIG. 8 is a diagram showing the principle of connection of the terminals.
Figure 9:
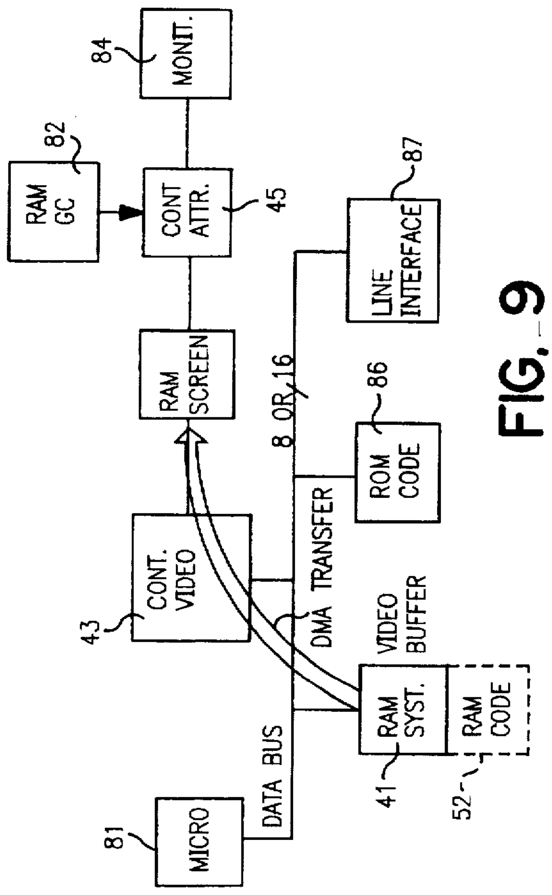
FIG. 9 PRIOR ART
FIG. 9 is a diagram showing the principle of a terminal. architecture according to the prior art.
Figure 10:
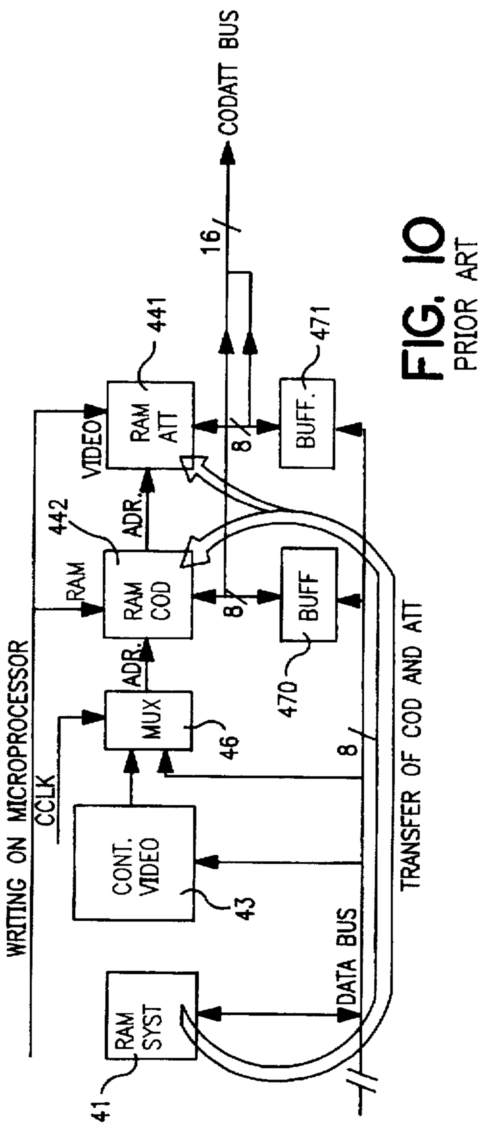
FIG. 10 PRIOR ART
FIG. 10 is a diagram showing the principle of a different terminal architecture of the prior art.
Figure 11:
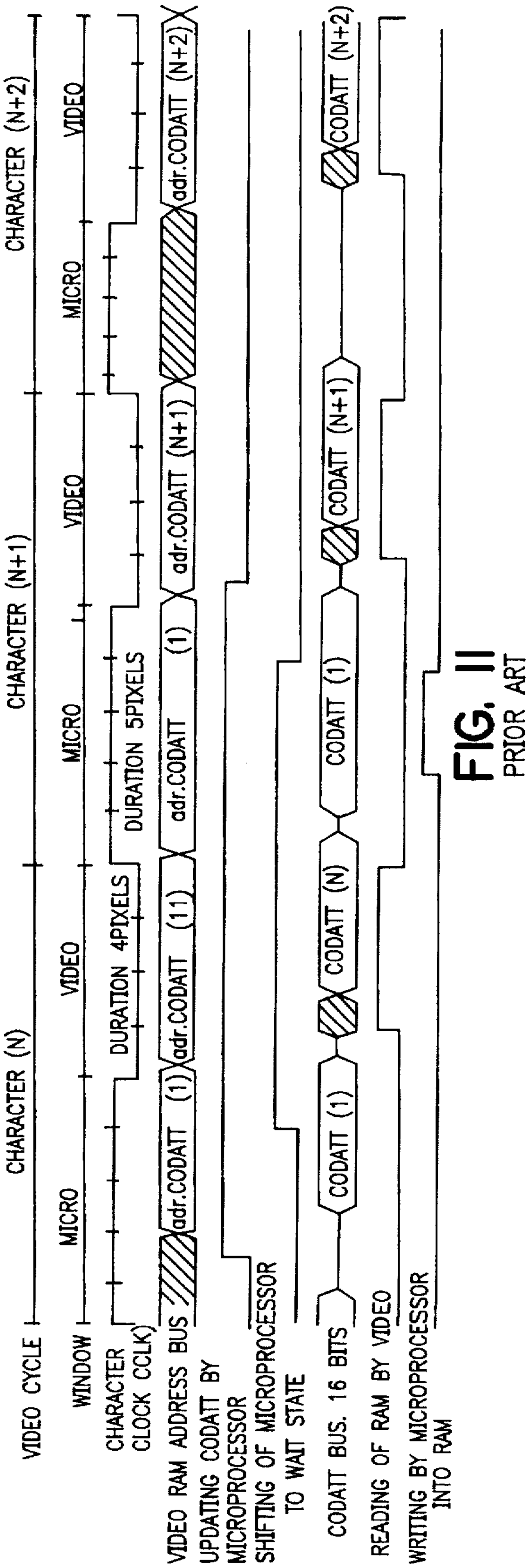
FIG. 11 PRIOR ART
FIG. 11 is a timing diagram of the exchanges among the elements of the architecture of FIG. 10.
Figure 12:
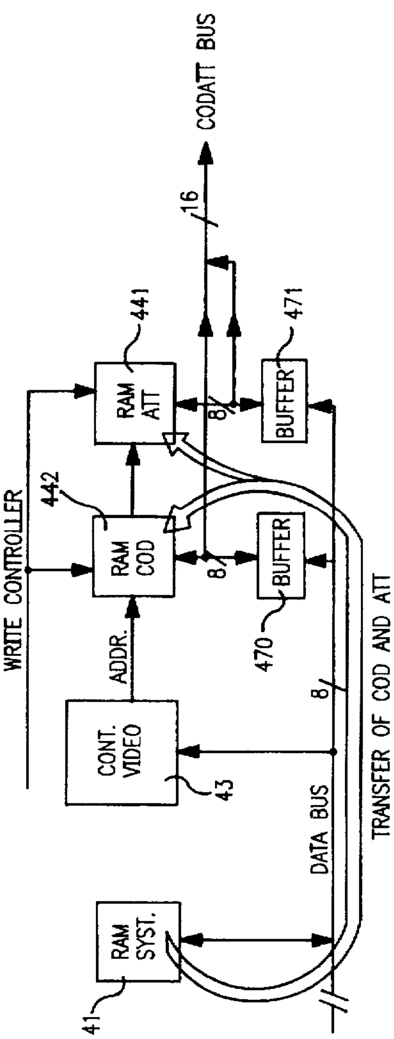
FIG. 12 PRIOR ART
FIG. 12 is a diagram showing the principle of another terminal architecture of the prior art.

The outputs of the pipeline that defined the 16 address, bits are also sent to the input of a 16-bit pointer counter 85470, 85471 that is incremented at the shifting rate of a character CODATT. This pointer counter makes it possible to effect counting anticipation by one character, as FIG. 7 shows, over the line 85471. This address, available at the output of the pipeline 85473, is loaded into the pointer counter 85470, 85471 before each beginning of a screen line by the row transfer signal 85570 (FIG. 7) and is furnished by the circuit 8557 that furnishes the control (8554) and command signals of the addressing circuit (85472).

A circuit 85476 for detecting the end of a physical row of the VRAM makes it possible to generate at its output a real time data transfer request RTDTR to a sequencer circuit 85477, which generates the signals RAS for row address validation, CAS for column address validation, DT for data transfer, WE for writing validation, and OE for opening the reading buffer, at the inputs 8554 of the VRAM 83 in accordance with the sequences necessary to enable functioning of the memory in one of the four possible modes explained hereinafter. The circuit 8557 also furnishers the following signals:

REF requesting a VRAM refreshment cycle;

NF for reinitializing the counter 85475 at the beginning of a new frame;

FR for fetch-request for new loading corresponding to a new row of characters;

and NLDTR for new line data transfer request.

The sequencer 85477 uses the signals RTDTR, REF, NLDTR and FR to generate the sequences of the signals RAS, CAS, DT, WE, OE (8554) required for one functional cycle in accordance with a selected mode of the memory 83. To generate the various models of access to the memory VRAM, this sequencer also plays the role of arbiter; thus, among others, it manages the signal HOLD which corresponds to a request for holding onto control of the bus 8549 on the part of the video circuit when one of the signals REF, RTDTR, FR or NLDTR of the circuit 85477 is activated. On receiving the acknowledgement signal HOLDA from the microprocessor, it thus assumes control of the microprocessor bus 8549 to perform the cycle requested. These two signals (HOLD, HOLDA) make it possible in particular to manage the exchanges with the microprocessor 81 during the critical instant of loading the VRAM serializer, in order to prevent the microprocessor from gaining access to the VRAM. The access contention for this VRAM by the microprocessor and the video is thus resolved during the transfer of one row in the serializer.

The multiplexer 854720 also includes input lines CPU-ADDL and CPU-ADDH connected to the address bus of the microprocessor 81 and three selection inputs SEL-MA0 through SEL-MA2, which make it possible to select one input among eight in order to present it there at the output of the multiplexer 854720 over the bus 8547.

These selection signals SEL-MA0 through SEL-MA2 are also furnished by the circuit 8557.

The VRAM refreshment cycle does not use the multiplexer circuit 854720, because the "CAS before RAS" VRAM mode is used.

The addressing circuit 855472 functions in accordance with four types of cycle:

1) a central processing unit (CPU 81) cycle, where the circuit 854720 multiplexes the low and high addresses CPU-ADDL and CPU-ADDH;
2) a fetch cycle (FETCH), where the circuit 854720 multiplexes the low addresses and high addresses FETCH-ADDL and FETCH-ADDH, the latter being furnished by the register 85474 loaded by the central processing unit CPU;
3) a data transfer cycle, where the address of the current row ROW-SR-ADDL and ROW-SR-ADDH is multiplexed to the VRAM and loaded into the pointer counter before each beginning of a screen line by the row transfer signal 85570;
4) a real time data transfer cycle RTDTR, where the outputs of the pointer counter anticipating the counting by one stroke furnishes the multiplexed addresses MEM-ADD-CTRH and MEM-ADD-CTRL to the VRAM for addressing the next physical row of the VRAM when the end of the preceding physical row of the VRAM is arrived at.

Thus, as shown in FIG. 4, the last CODATT of row number 2 is the character "G" of the syllable RANG of the word "RANGEE 2", the continuation of which is located at the next physical row address. The next physical row address is determined by cycle 4, by means of the pointer counter, which furnishes the address of the CODATT "E". In this way, the serializer, continuously receiving clock shift signals clk-decal, continuously outputs the CODATTs, "G", then "E", and so forth.

A clock circuit 8550 furnishes the clock signals and sequencing signals (8510–8514) necessary for the function of the circuit. In reading from memory, the data bus 8546 is connected by a buffer register 8543 with four inputs, the four outputs of which are connected to a multiplexer circuit with two inputs; of four lines and eight parallel outputs. The four lines of the address bus 8546 are also connected directly to four of the inputs of the multiplexing circuit. Thus the buffer 8543 enables the memorization of the first nibble of data furnished by the data bus 8546 and makes it possible to wait for the presentation of the second nibble furnished directly by the data bus to the second input nibble of a multiplexer 8544, so that by the nibble reading signal (lect-quart-1), the transmission of the first nibble to the multiplexer 8544 and, by the reading multiplexing signal (mux-lect), the transmission of the eight bits formed by the two nibbles at the output of the multiplexer can be validated. The reading multiplexer signal (mux-lect) is furnished by the line 85564 originating in the logic circuit 8556. The signal for reading of the first nibble is furnished by the line 85563 originating in the logic circuit 8556.

A subset 8500 to 8503 of the management circuit 85 interfaces the 4-line serial bus 8548 with the character generator memory 82. This subset constitutes four buffer registers 8500, 8501, 8502 and 8503, in cascade connection so as to form a pipeline. These buffer registers are commanded by the same clock signal CLK-CODATT delivered by the line 8510 of the sequencing circuit 8550. Thus at the end of four CODATT clock pulses, the outputs of the registers contain, respectively, the low attributes AL, the high attributes AH, the low code CL and the high code CH of one character of column x of row y. The four output lines of the first buffer register 8500, memorizing the last nibble sent by the memory, are sent to a second buffer register 8506, which then memorizes the high nibble of the character code CH(3:0) in synchronism with the CLK-CODATT clock signal 8510. Similarly, the outputs of the third buffer register 8502, memorizing the second nibble sent by the memory, are sent to a supplementary buffer register 8504 making it possible to memorize the high attribute nibble AH(3:0) of the character attributes. The low attribute and code nibbles AL(3:0) and CL(3:0), respectively, of each character are furnished directly by the second and third buffer registers 8501 and 8503. The eight lines formed of the four lines ATT(7:4) furnished by the register 8504 and the four lines AL(3:0) of the register 8503 constitute the eight attribute lines sent to the attribute controller 853. The four high nibble lines COD(7:4) of the character code that are furnished by the output of the buffer 8506 are combined with four lines 8508 furnishing the motif number, with four other output lines 8507 of the second buffer register 8501 furnishing the low nibbles CL(3:0) of the character code COD(3:0), and with two lines 8509 furnishing the nibbles number of the slice, to constitute a fourteen-line bus 8528 controlling the addresses of the read-write static memory 82. The nibble number of the slice corresponds to the elements marked nib 0 through nib 3 in FIG. 6, and the motif number corresponds to the slice number in FIG. 6. These numbers are furnished respectively by the output lines 8509–8508 of the counting circuits 8552 and 8551, respectively. The first counter 8552 is a modulo 4 counter, while the second is a modulo 16 counter parametrizable as a function of the number of slices or motifs of one character. The static memory also, via the lines 85530, receives the control signals furnished by the control logic 8553 and constituted by the circuit selection CS, reading writing WE, and output validation OE signals. The output of the memory 82 is interfaced with the monitor 84 via a subset constituted by four 4-bit buffer registers 8420–8523, cascade-connected in such a way as to constitute a pipeline and command it in synchronism by a clock signal clk-gcq furnished by the output line 8511 of the sequencing circuit 8550. The four outputs 8527 of the first buffer register 8523 are sent to four inputs of the attribute controller 853 and constitute the low/low nibble QLL of the 16 bits of each character slice. The four outputs 8526 of the second buffer register 8522 are sent to the four following Lines and constitute the low/high nibble QLH of the 16 constituent: points of a character slice. The outputs 8525 of the third register 8521 are connected to four other input lines of the circuit 853 and constitute the high/low nibbles QHL of the 16 points of one character slice, and finally, the four output lines 8524 of the fourth register 8520 are sent to the four other input lines of the video attribute controller 853 to constitute the high/high nibble QHH of the 16 points of a character slice. The attribute controller circuit 853 also receives a clock signal ech-motif furnished by the line 8512 of the sequencing circuit 8550. Finally, the attribute controller, in addition to the. three lines 8530, furnishes a horizontal retrace output HRTC and a vertical retrace output VRT to the monitor 84.

Management of the display of an alphanumeric terminal using a VRAM and the real-time transfer of rows of characters makes it possible to retain some trace of the current address of the memory position SRAM being shifted; the function is realized by a 16-bit counter ("pointer") 85470, 8547, the outputs of which coincide permanently with the RAM address of the CODATT word being shifted (or leaving the VRAM at that moment via the serial bus); to that end, this counter functions at the same frequency as the character clock that clocks the CODATTs, and since the data originating in RAM are nibbles, the four nibbles of each CODATT originating in the VRAM is thus serialized with a train of four pulses, the frequency of which is then four times the frequency of the CODATTs, or in other words 4×6=24 MHz. During the vertical retrace, in the non-active display portion, a sequencer loads the address of the beginning of the character row into the current row pointer buffer 85473; this latter will be reloaded upon each beginning of a new row of characters with the address of the beginning of the next row taken from the table of row pointers (FIGS. 4 and 7). Then, during the horizontal retrace of each active video line, a command for transfer from this buffer both to the inputs of the "pointer" counter 85470, 85471 and to the pointer of the VRAM then makes it possible to communicate this address of the beginning of the current row to the shift register, which is ready to shift the CODATT words beginning with the address loaded. At the beginning of each active video line portion, the shifter, which outputs the CODATT(i)s, for i varying from 1 to 132, for example, over the serial bus of the VRAM, is validated. Each data row N (8300) of the VRAM contains 512 nibbles (FIG. 3), numbered from 0 to 511, hence 256 8-bit bytes can accumulate a maximum of 128 CODATTs of 16 bits each; in this case, involving the 132 character-per-line display mode, reloading must be done "in real time" in the course of the video line in order to complete the CODATTs of the current character row. To do this, an end-of-row detection threshold is fixed, determined by the circuit 85476; when the outputs of the "pointer" counter of row N of the VRAM coincide with this threshold, a sequence initiates a "real time" transfer request RTDTR in order to proceed to the transfer of the row N+1 of the VRAM. This transfer, which takes place at a very precise moment specified by the VRAM, must be synchronized with the end of serialization of the last datum, that is, nibble 511 of row N of the VRAM; once the loading has been done, the shifter then begins to output the next CODATT data, beginning with the first nibble 0 of row N+1 of the VRAM. This "real time" loading can be obtained only if the VRAM address of the first memory position of the new row is known, that is, row "N+1" and column 0; a simple means of deducing "N+1" from "N" without using an adder is anticipation (as represented by line 85471, FIG. 7) of the validation of shifting upon each beginning of a video line of a duration equal to one character, and buffering the serialized data over four bits. Thus during the processing of the last CODATT(i−1) of row N of the VRAM, and because of the anticipation, the address of the next CODATT(i) is available at the outputs of the "pointer" counter: row "N+1", column 0; it thus suffices to use this in the "real time" transfer, to transmit this address to the pointer 85471, 85470 of the VRAM (FIG. 2).

Once the CODATT data has been assembled after the CODATT "pipeline", 16-bit words are retrieved: CODATT (15:0)=[COD(7:0), ATT(7:0)]=[CH, CL, AH, AL] (FIG. 2). The attribute ATT is sent to the attribute controller 853 and the code COD is associated with the character slice number or motif number, supplemented by an address defining a high or low nibble; this address GC over 13 bits makes it possible to extract the motif of the current character from the character generator on the basis of an SRAM memory with a 4-bit bus, all within the unit of time of one character (FIG. 7). From this reading of the SRAM, 16 bits are thus obtained, i.e. four nibbles GCQ3, GCQ2, GCQ1, GCQO when a character is represented over 16 bits; in the example selected, where the characters are based on motifs with nine pixels in the display over 132 columns, three nibbles are needed in order to have 9-pixel motifs. When the last nibble required to define the motif has been extracted from the character generator CG, a command to the attribute controller informs it that one pair, [ATT(7:0)](i) and [MOTIF(15:0) ](i) (or, MOTIF(8:0), for 132 columns), associated with the character i on the screen is available: The attribute controller then samples it and subsequently processes it (see also European patent application EP 87 400711.5, filed Apr. 1, 1987) into signals R, G, B that are intelligible to the cathode-ray-tube monitor. The sampling frequency of the attribute controller naturally follows the character frequency.

Figure 13:
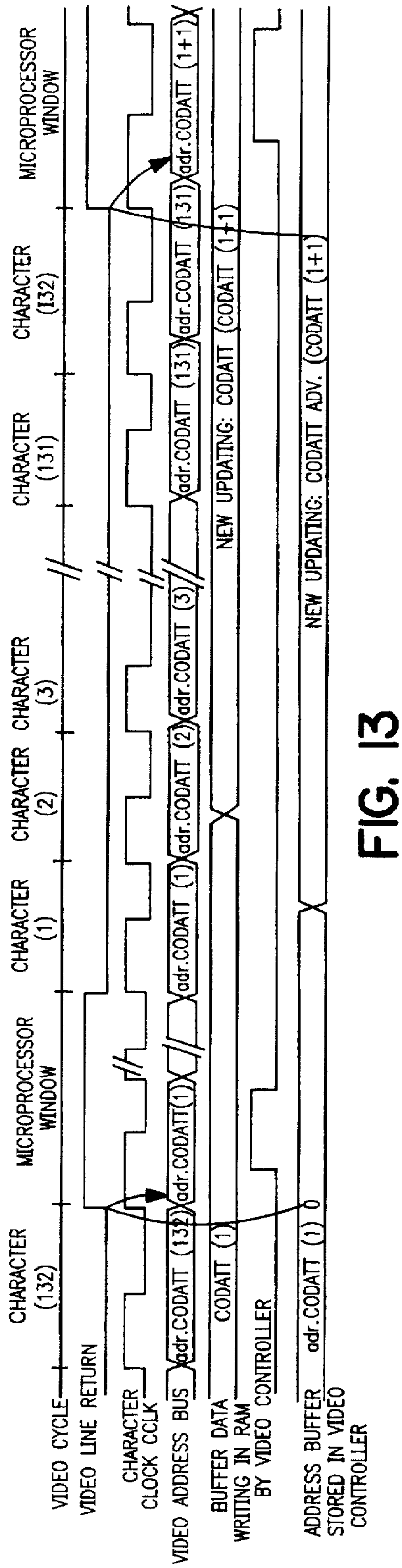
FIG. 13 PRIOR ART
FIG. 13 is a timing diagram for the exchanges among the elements of the architecture of FIG. 12.

The function of the circuit will now be described in detail, referring to FIG. 7, in which reference numeral 130 represents the scanning command signals, reference numeral 1300 represents the vertical retrace signal furnished by the output VRT, and reference numerals 1301 represent the horizontal retrace signals furnished by the output HRTC. Reference numeral 8301x represents the current row pointer and its progress over time. Reference numeral 8508 represents the value of the slice or motif number, progressing between 0 and 11 in the case of a character that includes 12 slices. Reference numeral 85470 represents the loading of the pointer counter with the value of the current row pointer, which is done before a row transfer is performed and before this row is then serialized. Turning first to the horizontal retrace 1303, the current row pointer, changing from the pointer value of row 1 to the pointer value of row 2, and the motif number changing from 11 to 0, the display of row 1 terminates in order for their to be a change to display of row 2. Each row includes 132 characters, and the address of the character to be displayed is determined by adding the value of a modulo-four counter, which gives the least significant addresses of the character, to the value of the row pointer 85470. Also added to this least significant portion defining the character number in the column is a second least significant portion constituted by the output of the counter 85471 that defines the address of the nibble of the CODATT word addressed in the memory, this CODATT word being constituted by four nibbles. The pointer counter set is constituted by the counters 85470 and 85471 and operates at the same frequency as the character clock CLK-CODATT. The counter 85471 performs a counting anticipation, which makes it possible to know the address of the first nibble of CODATT as soon as the character pointer of the next column in the same row is loaded. The character nibbles are transferred from VRAM to SRAM by the commands of the cycle command circuit 8557 and are shifted serially at the clock rate clk-decal represented by the line 85131 constituted by the output of a modulo-n counter 85230, which can be parametrized between 0 and 131 and the clock input of which receives a clock signal having a frequency 8513 corresponding to that of the clk-decal signal. The four serially output nibbles are stored temporarily in the buffer registers 8500–8503 at the rate of the clk-codatt clock represented by the line 8510. This clock corresponds to a signal having the same frequency as the clk-decal clock, but shifted by one period and inverted. The lines 8500–8503 represent the contents of the corresponding buffers from FIG. 2 at the instant of processing of the characters. These lines also represent the shifting of the characters over time as a function of the clock signal clk-codatt in such a way that the moment that pulses ech-cod-att appear, corresponding to the character 0 represented by the arrows 134, 135, 136, the nibbles of this character CHO, CLO, AHO, ALO are found in the registers 8500, 8501, 8502 and 8503, respectively. At ech-cod-att clock pulse 136, the transfer of the characters CH-O and AH-O is done into the buffer registers 8504 and 8506, and the attributes of the character O appear at the input of the circuit 853, while the code of the character O is combined with the motif number and the digitized character nibble number to serve as an address with a view to addressing the RAM memory 82. The nibble number is furnished by a counter 8552 that receives a clock signal 8511 having the same frequency as the clock signal clk-gcq, but shifted forward by one half-period. This counter 8552 can be parametrized between 0 and 4 to count a number of nibbles depending on the number of points represented in one character slice. The motif number is furnished by the output 8508 of the circuit 8551, which in fact is a character slice counter that can be parametrized between 0 and 15. This motif number counter being incremented by one each time the nibble counter has reached the maximum value for which it has been parametrized. With the address thus constituted, the command circuit 855, by way of the control portion 8553, furnishes the signals CS, WE and OE necessary for the operation of the RAM 82 for reading; over the bus 8529, the RAM furnishes the data constituting the points of one slice of one character. These data are furnished in the form of nibbles, identified as QLL, QLH, QHL and QHH, which are loaded progressively into the buffer registers 8520–8523 at the rate of the clock clk-gcq furnished by the line 8511. A synchronizing signal 8512 furnishing the signal ech-motif and constituted by the output of a counter that is programmable as a function of the number of display points of one character, in this particular case 9. This signal makes it possible to effect the transfer of the nibbles from the buffer registers to the attribute controller when the requisite character points for the display have been stored in memory. In the case of nine pixels, the nibble QHH is not used, and for that reason it has not been shown on line 8529 of the diagram in FIG. 13.

While this invention has been described in conjunction with specific embodiments thereof, it is evident that many alternatives, modifications and variations will be apparent to those skilled in the art. Accordingly, the preferred embodiments of the invention, as set forth herein, are intended to be illustrative, not limiting. Various changes may be made without departing from the spirit and scope of the invention as described herein and defined in the claims.

What is claimed is:

1. A terminal architecture, comprising:

a microprocessor chip (581);

a video memory chip (83);

a read-write character generator memory chip (82); and a monolithic integrated management circuit chip wherein said monolithic integrated management circuit chip is connected to said microprocessor chip by a first data bus (8549) and a first address bus (8558), said management circuit chip managing a video display on a monitor (84) and accessing said video memory chip via a parallel data bus (8546) and a serial bus (8548), said video memory chip comprising a system memory storing an operating system of the terminal and a display memory;

a read-write character generator memory (82) connected to and controlled by said management circuit chip through a second address bus (8528) and a second data bus (8529); and five output lines provided by the management circuit chip for delivering three color signals, a horizontal return signal and a vertical return (VRT) signal to the monitor.

2. The terminal architecture of claim 1, wherein the management circuit means is connected with address lines of the video memory (83) by a third address bus (8547), said management circuit means being connected to a dynamic RAM (830) of the video memory (83) for reading and writing accesses to the video memory by a parallel data bus (8546), said management circuit means also being connected to a static RAM (831) of the video memory (83) by a serial bus (8548) for reading a code and attributes of a current character, said management circuit means further comprising:

command circuit means (85477) for establishing access cycles and serial shift of the video memory;

a first memory circuit (8500–8506) for storing the code and attributes of the current character enabling transmission of the attributes to an attribute controller circuit, said attribute controller circuit providing the three color signals, the horizontal return signal and the vertical return signal for controlling the monitor (84); and a second memory circuit (8520–8523) for storing data comprising a motif of a character originating in the read-write character generator memory (82).

3. The terminal architecture of claim 2, wherein said second memory circuit comprises:

a pipeline comprising four series-connected buffer registers (8520–8523), an output of said series-connected buffer registers being transmitted to inputs of the attribute controller circuit (853) as a function of a signal provided by a motif counter (ech-motif 8512) of a sequencing circuit (8550), said motif counter being programmed between 0 and 15 as a function of a number of pixels per motif, said motif comprising between 9 and 15 pixels per character slice.

4. The terminal architecture of claim 2, wherein the first memory circuit further comprises an automatic machine (85477, 8557) for managing from 1 to 132 columns and 1 to 512 lines per screen.

5. The terminal architecture of claim 4, wherein the automatic machine manages signals for interfacing with read-write video memories by providing signals (RAS, CAS, DT, OE) required for functioning of said interfaced video memories, said signals including refresh signals, data transfer signals, and signals for serializing the static RAM portion of said video memory.

6. The terminal architecture of claim 2, further comprising:

a character slice counter (8551) parameterizable from 1 to 16 (8508) to adapt a number of slices of a displayed character between 1 and 16, said character slice counter being used in combination with the character code and a nibble counter (8552), said nibble counter being parameterizable between 0 to 3 to adapt a number of columns of the matrix constituting the character between 8 and 15, said combination providing an address of the motif in the character generator; and a command circuit (8553) for providing signals (CS, WE, OE) to the read-write character generator memory (82).

7. The terminal architecture of claim 1, wherein said management circuit means (85) further comprises:

first means for providing a signal (HOLD) corresponding to a request from the management circuit means for controlling the first data bus (8549) and second means for receiving an acknowledgement signal (HOLDA) from the microprocessor, said first and second means enabling the management circuit means to perform the requested cycle, said requested cycle being at least one of a video memory refresh cycle, a reinitialization of a counter (85475) at the beginning of a new frame delivering, through a multiplexer (854720) to the address bus (8547) of the video memory (83), a low portion of a current row pointer address, a fetch request, and a new line data transfer request, said first and second means (HOLD, HOLDA) managing exchanges with the microprocessor during a critical time during loading of a serializer of a video memory static RAM to prevent access by the microprocessor of the video memory to resolve competition for access to said video memory during transfer of a row into the serializer, said serializer serializing information (CODATT) constituting code and attribute information of a current character on a serial bus (8548).

8. The terminal architecture of claim 2, wherein the first memory circuit for enabling storage of the code and attributes of a character is a pipeline comprising a first set of series-connected buffer registers (8500–8503) and a second set of buffer registers (8504–8506), wherein an output of each register of said second set of buffer registers is connected to a register of the first set of buffer registers, said first set of buffer registers being loaded at a rate of a signal of a modulo-n counter, wherein n is a number of registers in the first set of buffer registers.

9. The terminal architecture of claim 1, wherein the management circuit means further comprises a pointer counter, (85470, 85471), incremented at a shifting rate of a character (CODATT) and loaded before a beginning of each screen line with an address available at an output of a pipeline circuit (85473) and delivering to a multiplexer (854720) an address (MEM-ADD-CTRH, MEM-ADD-CTRL) of a display row being processed.

10. The terminal architecture of claim 2, wherein the management circuit means further comprises an addressing managing circuit (85472) for transferring data from the video memory (83) to the management circuit means (85) by one of the parallel data bus (8546) and the serial bus (8548), the bus being selected based on a sequence of signals transmitted by the command circuit means that commands the access cycle s and a serial shift.

11. The terminal architecture of claim 10, wherein the addressing managing circuit (85472) comprises a multiplexer (854720) having eight input bytes and a 9-line output among eight address possibilities, said address possibilities depending on signals furnished by a control circuit (8557) for control and command of said addressing managing circuit (85472) for the function of the access cycle selected.

12. The terminal architecture of claim 1, wherein a first two of the eight address possibilities are provided by addresses of the bus connecting the management circuit means to a microprocessor (81) and are selected by a cycle of access by the microprocessor access to the video memory.

13. The terminal architecture of claim 12, wherein a second two of the eight possibilities are the outputs of an 8-bit counter (85475) reset to zero by a new frame signal (NF) delivered by the control circuit (8557) and incremented with each new character row displayed, and the outputs of a buffer register that receives eight address bits provided by the microprocessor and defining the address of a beginning of a pointing table (8301) upon each new row of characters and selected by a fetch cycle to load the address of a current row pointer.

14. The terminal architecture of claim 13, wherein a third two of the eight possibilities are eight low address bits and eight high address bits of the current row pointer, comprising outputs of a register pipeline (85473) selected by a data transfer cycle to load the current row address into the video memory before beginning of each new screen line and before a serializer of the video memory is emptied.

15. The terminal architecture of claim 14, wherein a fourth two of the eight possibilities are eight low address bits and eight high address bits of a pointer counter (85470, 85471) loaded before a beginning of each screen line by the address of the current row pointer, with an early counting of one pulse to define the address of the physical row following the video memory when a comparison circuit (85476) connected to the pointer counter detects a physical end of a row and triggers a real-time data transfer cycle in response thereto.

16. The terminal architecture of claim 3, wherein the first memory circuit further comprises an automatic machine (85477, 8557) for managing from 1 to 132 columns and 1 to 512 lines per screen.

17. The terminal architecture of claim 3, wherein the automatic machine manages signals for interfacing with read-write video memories by providing signals (RAS, CAS, DT, OE) required for functioning of said interfaced video memories, said signals including refresh signals, data transfer signals, and signals for serializing the static RAM portion of said video memory.

18. The terminal architecture of claim 5, further comprising:

a character slice counter (8551) parameterizable from 1 to 16 (8508) to adapt a number of slices of a displayed character between 1 and 16, said character slice counter being used in combination with the character code and a nibble counter (8552), said nibble counter being parameterizable between 0 to 3 to adapt a number of columns of the matrix constituting the character between 8 and 15, said combination providing an address of the motif in the character generator; and a command circuit (8553) for providing signals (CS, WE, OE) to the read-write character generator memory (82).

19. The terminal architecture of claim 2, wherein said management circuit means (85) further comprises:

first means for providing a signal (HOLD) corresponding to a request from the management circuit means for controlling the first data bus (8549) and second means for receiving an acknowledgement signal (HOLDA) from the microprocessor, said first and second means enabling the management circuit means to perform the requested cycle, said requested cycle being at least one of a video memory refresh cycle, a reinitialization of a counter (85475) at the beginning of a new frame delivering, through a multiplexer (854720) to the address bus (8547) of the video memory (83), a low portion of a current row pointer address, a fetch request, and a new line data transfer request, said first and second means (HOLD, HOLDA) managing exchanges with the microprocessor during a critical time during loading of serializer of the video memory static RAM to prevent access by the microprocessor of the video memory to resolve competition for access to said video memory during transfer of a row into the serializer, said serializer serializing information (CODATT) constituting the code and the attributes of the current character on the serial bus (8548).

20. The terminal architecture of claim 2, wherein the management circuit means further comprises a pointer counter (85470, 85471), a triggering of said pointer counter having a duration equal to one character at a beginning of each video line and furnishing an address (MEM-ADD-CTRH, MEM-ADD-CTRL) of a display row being processed.

21. The terminal architecture of claim 3, wherein said management circuit means (85) further comprises:

first means for providing a signal (HOLD) corresponding to a request from the management circuit means for controlling the first data bus (8549) and second means for receiving an acknowledgement signal (HOLDA) from the microprocessor, said first and second means enabling the management circuit means to perform the requested cycle, said requested cycle being at least one of a video memory refresh cycle, a reinitialization of a counter (85475) at the beginning of a new frame delivering, through a multiplexer (854720) to the address bus (8547) of the video memory (83), a low portion of a current row pointer address, a fetch request, and a new line data transfer request, said first and second means (HOLD, HOLDA) managing exchanges with the microprocessor during a critical time during loading of a serializer of the video memory static RAM to prevent access by the microprocessor of the video memory to resolve competition for access to said video memory during transfer of a row into the serializer, said serializer serializing information (CODATT) constituting the code and the attributes of the current character on the serial bus (8548).

22. The terminal architecture of claim 3, wherein the management circuit means further comprises a pointer counter (85470, 85471), incremented at a shifting rate of the character (CODATT) and loaded before a beginning of each screen line with an address available at an output of the pipeline circuit (85473) and delivering to a multiplexer (854720) an address (MEM-ADD-CTRH, MEM-ADD-CTRL) of a display row being processed.

23. A management of circuit for a video memory, a read-write character generator memory (82) and a monitor, said management circuit comprising, in an integrated monolithic circuit:

circuit means (85477) for managing access to the video memory;

a control automaton controlling access, refresh, data transfer cycles and serial shift of the video memory;

a command circuit (8553) providing signals for operation of the read-write character generator memory (82);

an attribute controller circuit (853) connected to a first memory circuit (8500–8506) for storing a code and attributes of a current character enabling transmission of the attributes to an attribute controller circuit; and a second memory circuit (8520–8523) for storing data comprising a motif of a character originating in the read-write character generator memory (82).

24. The management circuit of claim 23, wherein said second memory circuit comprises:

a pipeline comprising four series-connected buffer registers (8520–8523), an output of said series-connected buffer registers being transmitted to inputs of the attribute controller circuit (853) as a function of a signal provided by a motif counter (ech-motif 8512) of a sequencing circuit (8550), said motif counter being programmed between 0 and 15 as a function of a number of pixels per motif, said motif comprising between 9 and 15 pixels per character slice.

25. The management circuit of claim 23, wherein the first memory circuit further comprises an automatic machine (85477, 8557) for managing from 1 to 132 columns and 1 to 512 lines per screen.

26. The management circuit of claim 25, wherein the automatic machine manages signals for interfacing with readwrite video memories by providing signals (RAS, CAS, DT, OE) required for functioning of said interfaced video memories, said signals including refresh signals, data transfer signals, and signals for serializing a static RAM portion of said video memory.

27. The management circuit of claim 23, further comprising:

a character slice counter (8551) parameterizable from 1 to 16 (8508) to adapt a number of slices of a displayed character between 1 and 16, said character slice counter being used in combination with the character code and a nibble counter (8552), said nibble counter being parameterizable between 0 to 3 to adapt a number of columns of the matrix constituting the character between 8 and 15, said combination providing an address of the motif in the character generator.

28. The management circuit of claim 23, wherein said management circuit further comprises:

first means for providing a signal (HOLD) corresponding to a request from the management circuit for controlling the first data bus (8549) and second means for receiving an acknowledgement signal (HOLDA) from the microprocessor, said first and second means enabling the management circuit to perform the requested cycle, said requested cycle being at least one of a video memory refresh cycle, a reinitialization of a counter (85475) at the beginning of a new frame delivering, through the multiplexer (854720) to the address bus (8547) of the video memory (83), a low portion of a current row pointer address, a fetch request, and a new line data transfer request, said first and second means (HOLD, HOLDA) managing exchanges with the microprocessor during a critical time during loading of a serializer of a video memory static RAM to prevent access by the microprocessor of the video memory to resolve competition for access to said video memory during transfer of a row into the serializer, said serializer serializing information (CODATT) constituting the code and attributes of a current character on a serial bus (8548).

29. The management circuit of claim 23, wherein the first memory circuit for enabling storage of the code and attributes of a character is a pipeline comprising a first set of series-connected buffer registers (8500–8503) and a second set of buffer registers (8504, 8506), wherein an output of each register of said second set of buffer registers is connected to a register of the first set of buffer registers, said first set of buffer registers being loaded at a rate of a signal of a modulo-n counter, wherein n is a number of registers in the first set of buffer registers.

30. The management circuit of claim 23, wherein the management circuit further comprises a pointer counter (85470, 85471), a triggering of said pointer counter having a duration equal to one character at a beginning of each video line and furnishing an address (MEM-ADD-CTRH, MEM-ADD-CTRL) of a display row being processed.

31. The management circuit of claim 23, wherein the management circuit further comprises an addressing managing circuit (85472) for transferring data from the video memory (83) to the management circuit (85) by one of a parallel data bus (8546) and a serial bus (8548), the bus being selected based on a sequence of signals transmitted by the command circuit that commands the access cycles and a serial shift.

32. The management circuit of claim 31, wherein the addressing managing circuit (85472) comprises a multiplexer (854720) having eight input bytes and a 9-line output among eight address possibilities, said address possibilities depending on signals furnished by a control circuit (8557) for control and command of said addressing managing circuit (85472) for the function of the access cycle selected.

33. The management circuit of claim 32, wherein a first two of the eight address possibilities are provided by addresses of the bus connecting the management circuit to a central processing unit (81) and are selected by a cycle of access by the central processing unit access to the video memory.

34. The management circuit claim 33, wherein a second two of the eight possibilities are the outputs of an 8-bit counter (85475) reset to zero by a new frame signal (NF) and incremented with each new character row displayed, and the outputs of a buffer register that receives eight address bits provided by the central processing unit and defining the address of a beginning of a pointing table (8301) upon each new row of characters and selected by a fetch cycle to load the address of the current row pointer.

35. The management circuit of claim 34, wherein a third two of the eight possibilities are eight low address bits and eight high address bits of the current row pointer, comprising outputs of a register pipeline (85473) selected by a data transfer cycle to load the current row address into the video memory before beginning of each new screen line and before the serializer of the video memory is emptied.

36. The management circuit of claim 35, wherein a fourth two of the eight possibilities are eight low address bits and eight high address bits of a pointer counter (85470, 85471) loaded before a beginning of each screen line by the address of the current row pointer, with an early counting of one pulse to define the address of the physical row following the video memory when a comparison circuit (85476) detects a physical end of a row and triggers a real-time data transfer cycle in response thereto.

* * * * *

UNITED STATES PATENT AND TRADEMARK OFFICE

CERTIFICATE OF CORRECTION

PATENT NO. : 5,799,202

DATED : August 25, ]998

INVENTOR(S) : Eric RONGIONE

It is certified that error appears in the above-indentified patent and that said Letters Patent is hereby corrected as shown below:

Title page,
Item [57] Abstract, line 13,
change "(8529)" first occurrence to - - (8528) - -.

In claim 12, Column 16, line 11 of the Patent, after claim, delete "1" and replace with - - 11 - -.

In claim 26, Column 18, line 30 of the Patent, "readwrite" should be - - read-write - -.

In claim 34, Column 20, line 7, of the Patent, after "circuit" and before "claim" insert - - of - -.

Signed and Sealed this

Sixteenth Day of November, 1999

*Attest:*

Q. TODD DICKINSON

*Attesting Officer*

*Acting Commissioner of Patents and Trademarks*